United States Patent
Nilsson (10) Patent No.: US 10,260,392 B2
(45) Date of Patent: *Apr. 16, 2019

(54) METHOD AND SYSTEM FOR CONTROLLING NITROGEN OXIDE EMISSIONS FROM A COMBUSTION ENGINE

(71) Applicant: Scania CV AB, Södertälje (SE)

(72) Inventor: Magnus Nilsson, Årsta (SE)

(73) Assignee: SCANIA CV AB, Södertälje (SE)

( * ) Notice: Subject to any disclaimer, the term of this patent is extended or adjusted under 35 U.S.C. 154(b) by 180 days.

This patent is subject to a terminal disclaimer.

(21) Appl. No.: 15/120,104

(22) PCT Filed: Feb. 27, 2015

(86) PCT No.: PCT/SE2015/050228
§ 371 (c)(1),
(2) Date: Aug. 18, 2016

(87) PCT Pub. No.: WO2015/130218
PCT Pub. Date: Sep. 3, 2015

(65) Prior Publication Data
US 2017/0082003 A1    Mar. 23, 2017

(30) Foreign Application Priority Data

Feb. 28, 2014 (SE) .................................. 1450229
Feb. 28, 2014 (SE) .................................. 1450230

(51) Int. Cl.
*F01N 13/00* (2010.01)
*F01N 3/021* (2006.01)
(Continued)

(52) U.S. Cl.
CPC ......... *F01N 3/208* (2013.01); *B01D 46/0027* (2013.01); *B01D 46/0061* (2013.01);
(Continued)

(58) Field of Classification Search
CPC ............ B01D 46/0027; B01D 46/0061; B01D 53/9418; B01D 53/9495; B01D 2279/30;
(Continued)

(56) References Cited

U.S. PATENT DOCUMENTS

| 5,120,695 A | 6/1992 | Blumrich et al. |
| 5,239,860 A | 8/1993 | Harris et al. |

(Continued)

FOREIGN PATENT DOCUMENTS

| CN | 201513221 U | 6/2010 |
| CN | 103442805 | 12/2013 |

(Continued)

OTHER PUBLICATIONS

European Search Report for European Patent Application No. PCT/SE2015050228 dated Sep. 12, 2017.

(Continued)

*Primary Examiner* — Brandon D Lee
(74) *Attorney, Agent, or Firm* — Moore & Van Allen PLLC; W. Kevin Ransom (57) ABSTRACT

A treatment system for providing treatment of an exhaust stream comprising nitrogen oxides $NO_x$, in which nitrogen monoxide NO and nitrogen dioxide $NO_2$ are comprised. When the exhaust stream passes through the treatment system, oxidation occurs of compounds comprising nitrogen, carbon and/or hydrogen. An amount of nitrogen oxides $NO_x$ reaching a reduction catalyst device downstream of the oxidizing component in the exhaust treatment system is reduced. A ratio $(NO_2/NO_x)_{det}$ between an amount of nitrogen dioxide $NO_2$ reaching a reduction catalyst device and the amount of nitrogen oxides $NO_x$ reaching the reduction catalyst device is determined. An active control of at least one parameter related to the combustion engine is carried out, based on the determined ratio, so that the amount of nitrogen oxides $NO_x$ reaching the reduction catalyst device is increased, if the determined ratio $(NO_2/NO_x)_{det}$ exceeds an upper threshold value $(NO_2/NO_x)_{threshold\_high}$.

29 Claims, 6 Drawing Sheets

(51) Int. Cl.
| | |
|---|---|
| F01N 3/20 | (2006.01) |
| F01N 3/035 | (2006.01) |
| F01N 3/10 | (2006.01) |
| B01D 46/00 | (2006.01) |
| B01D 53/94 | (2006.01) |
| F01N 11/00 | (2006.01) |
| F01N 9/00 | (2006.01) |
| F01N 3/023 | (2006.01) |

(52) U.S. Cl.
CPC ..... *B01D 53/9418* (2013.01); *B01D 53/9495* (2013.01); *F01N 3/021* (2013.01); *F01N 3/023* (2013.01); *F01N 3/035* (2013.01); *F01N 3/103* (2013.01); *F01N 3/106* (2013.01); *F01N 3/2066* (2013.01); *F01N 9/00* (2013.01); *F01N 11/002* (2013.01); *F01N 13/009* (2014.06); *F01N 13/0093* (2014.06); *F01N 13/0097* (2014.06); *B01D 2279/30* (2013.01); *F01N 2430/00* (2013.01); *F01N 2510/06* (2013.01); *F01N 2570/14* (2013.01); *F01N 2590/08* (2013.01); *F01N 2610/02* (2013.01); *F01N 2610/144* (2013.01); *F01N 2900/04* (2013.01); *F01N 2900/14* (2013.01); *F01N 2900/1402* (2013.01); *F01N 2900/1404* (2013.01); *F01N 2900/1616* (2013.01); *Y02A 50/2344* (2018.01); *Y02T 10/24* (2013.01); *Y02T 10/47* (2013.01)

(58) Field of Classification Search
CPC .. F01N 11/002; F01N 13/009; F01N 13/0093; F01N 13/0097; F01N 3/021; F01N 3/023; F01N 3/035; F01N 3/103; F01N 3/106; F01N 3/2066; F01N 3/208; F01N 9/00; F01N 2430/00; F01N 2510/06; F01N 2570/14; F01N 2590/08; F01N 2610/02; F01N 2610/144; F01N 2900/04; F01N 2900/14; F01N 2900/1402; F01N 2900/1404; F01N 2900/1616; Y02A 50/2344; Y02T 10/24; Y02T 10/47
See application file for complete search history.

(56) References Cited

U.S. PATENT DOCUMENTS

| | | |
|---|---|---|
| 7,559,194 B2 | 7/2009 | Westerberg |
| 8,544,260 B2 | 10/2013 | Boorse et al. |
| 9,573,097 B2 | 2/2017 | Reichinger et al. |
| 9,670,855 B2 | 6/2017 | Dickson et al. |
| 2004/0040289 A1 | 3/2004 | Mazur et al. |
| 2004/0098979 A1 | 5/2004 | Hammerle et al. |
| 2005/0069476 A1 | 3/2005 | Blakeman et al. |
| 2005/0232830 A1 | 10/2005 | Brueck |
| 2006/0039843 A1 | 2/2006 | Patchett et al. |
| 2007/0150154 A1 | 6/2007 | Lenz |
| 2008/0008629 A1 | 1/2008 | Doring et al. |
| 2008/0060348 A1 | 3/2008 | Robel et al. |
| 2009/0035194 A1 | 2/2009 | Robel et al. |
| 2009/0035195 A1 | 2/2009 | Robel |
| 2010/0024393 A1 | 2/2010 | Chi et al. |
| 2010/0050604 A1 | 3/2010 | Hoard et al. |
| 2010/0252737 A1 | 10/2010 | Fournel et al. |
| 2010/0319320 A1 | 12/2010 | Mital et al. |
| 2011/0085954 A1 | 4/2011 | Doring et al. |
| 2011/0113759 A1 | 5/2011 | Tilinski et al. |
| 2011/0211193 A1 | 9/2011 | Saveliev et al. |
| 2011/0271664 A1 | 11/2011 | Boorse et al. |
| 2011/0295484 A1 | 12/2011 | L'Henoret |
| 2011/0313635 A1 | 12/2011 | Blanc et al. |
| 2012/0117954 A1 | 5/2012 | Yasui et al. |
| 2012/0255286 A1 | 10/2012 | Matsunaga et al. |
| 2013/0078173 A1 | 3/2013 | Cox |
| 2013/0202507 A1 | 8/2013 | Echoff et al. |
| 2013/0232953 A1 | 9/2013 | Harmsen et al. |
| 2013/0232958 A1 | 9/2013 | Ancimer et al. |
| 2013/0289857 A1 | 10/2013 | Schmitt et al. |
| 2014/0052353 A1 | 2/2014 | Sujan et al. |
| 2014/0056789 A1 | 2/2014 | Mussmann et al. |
| 2014/0065044 A1 | 3/2014 | Ito et al. |
| 2014/0229010 A1 | 8/2014 | Farquharson et al. |
| 2015/0052878 A1 | 2/2015 | Qi |
| 2015/0131093 A1 | 5/2015 | Saptari |
| 2015/0337702 A1 | 11/2015 | Ettireddy et al. |
| 2016/0166990 A1 | 6/2016 | Phillips et al. |

FOREIGN PATENT DOCUMENTS

| | | |
|---|---|---|
| DE | 3733501 A1 | 4/1989 |
| DE | 102006031650 A1 | 1/2008 |
| DE | 102008026191 A1 | 1/2009 |
| DE | 102009038835 A1 | 3/2011 |
| DE | 102010050312 A1 | 5/2012 |
| DE | 102012201809 A1 | 9/2012 |
| DE | 202013101028 U1 | 5/2013 |
| DE | 102015015260 A1 | 6/2017 |
| EP | 1181531 A1 | 2/2002 |
| EP | 2390480 A1 | 11/2011 |
| KR | 20140143145 A1 | 12/2014 |
| RU | 2354833 C2 | 6/2010 |
| RU | 2504668 C2 | 2/2017 |
| WO | WO0050974 A2 | 8/2000 |
| WO | 2007104382 A1 | 9/2007 |
| WO | 2009017639 A1 | 2/2009 |
| WO | 2012037342 A1 | 3/2012 |
| WO | 2013022516 A1 | 2/2013 |
| WO | 2013095214 A1 | 6/2013 |
| WO | 2013100846 A1 | 7/2013 |
| WO | 2014016616 A1 | 1/2014 |
| WO | 2014149297 A1 | 9/2014 |

OTHER PUBLICATIONS

International Search Report and Written Opinion of the International Searching Authority for PCT/SE2015/050228 dated Jun. 12, 2015.

International Preliminary Report on Patentability of PCT/SE2015/050228 dated Jun. 8, 2016.

Botar-Jid, Claudiu Cristian (2007)—Selective catalytic reduction of nitrogen oxides with ammonia in forced unsteady state reactors—Case based reasoning and mathematical model simulation reasoning; Retrieved online from http://urn.fi/URN:ISBN:978-952-214-469-0; p. 3, second paragraph.

NOx Controls; EPA/452/B-02-001 Section 4—Retrieved online on Jun. 5, 2015 from http://www.epa.gov/ttncatc1/dir1/cs4-2ch2.pdf; pp. 2-6, third paragraph.

METHOD AND SYSTEM FOR CONTROLLING NITROGEN OXIDE EMISSIONS FROM A COMBUSTION ENGINE

CROSS-REFERENCE TO RELATED APPLICATIONS

This application is a national stage application (filed under 35 § U.S.C. 371) of PCT/SE15/050228, filed Feb. 27, 2015 of the same title, which, in turn, claims priority to Swedish Application Nos. SE1450229-8 and SE1450230-6, both filed Feb. 28, 2014 of the same title; the contents of each of which are hereby incorporated by reference.

FIELD OF THE INVENTION

The present invention relates to a method, exhaust treatment system, and computer program product for treatment of an exhaust stream.

BACKGROUND

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements, defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words that an engine, which is permitted to emit more nitrogen oxides $NO_x$ may be induced to consume less fuel, which may yield a higher combustion efficiency. Similarly, there is often a negative correlation between a produced particle mass PM and the fuel efficiency, meaning that an increased emission of particle mass PM from the engine is connected with an increased fuel consumption.

This correlation is the background to the widespread use of exhaust treatment systems comprising an SCR-catalyst, where the intention is the optimization of the engine's fuel consumption and emission of particles, towards a relatively larger amount of nitrogen oxides $NO_x$ produced. A reduction of these nitrogen oxides $NO_x$ is then carried out in the exhaust treatment system, which thus may also comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

BRIEF DESCRIPTION OF THE INVENTION

To some extent, the performance of the exhaust treatment system may be enhanced by increasing the substrate volumes comprised in the exhaust treatment system, which in particular reduces losses due to uneven distribution of the exhaust flow through the substrate. At the same time, a larger substrate volume provides a greater back pressure, which may counteract gains in fuel efficiency due to the higher conversion degree. Larger substrate volumes also entail an increased cost. It is thus important to be able to use the exhaust treatment system optimally, for example by avoiding over-sizing and/or by limiting the exhaust treatment system's spread in terms of size and/or manufacturing cost.

The function and efficiency for catalysts in general, and for reduction catalyst in particular, is dependent, for example, on a ratio between nitrogen dioxide and nitrogen oxides, that is to say the $NO_2/NO_x$-fraction, in the exhausts. The $NO_2/NO_x$-fraction depends, however, on a number of other factors, for example how the driver drives the vehicle and/or on a current driving mode. For example, the $NO_2/NO_x$-fraction in the exhausts may depend on the torque requested by a driver and/or by a cruise control, on the appearance of the road section in which the vehicle is located and/or the driving style of the driver.

In some conditions regarding the catalyst temperature and flow, i.e. for a certain dwell-time in the catalyst ("Space Velocity"), there is a risk that a non-advantageous fraction of nitrogen dioxides $NO_2$ is obtained. Specifically, there is a risk that the ratio $NO_2/NO_x$ exceeds 50%, which may constitute a real problem for exhaust purification.

There is a risk that an optimization of the ratio $NO_2/NO_x$ for any of the above mentioned critical operating modes may result in too high a fraction of nitrogen dioxides $NO_2$ in other operating modes. This higher fraction of nitrogen dioxides $NO_2$ results in a greater volume requirement for the SCR-catalyst, and/or in a limitation of the amount of nitrogen oxides released from the engine, and accordingly in a poorer fuel efficiency for the vehicle.

In addition, there is a risk that the higher fraction of nitrogen dioxides $NO_2$ also results in emissions of laughing gas $N_2O$.

These risks of a non-advantageous fraction of nitrogen dioxide $NO_2$ arising also exist due to the system's ageing. For example, the ratio $NO_2/NO_x$ may assume lower values when the system has aged, which may entail that a catalyst specification, which results in too high fractions of $NO_2/NO_x$ in a non-aged state, must be used to compensate for ageing.

There is accordingly a need for an optimization of the function in today's exhaust treatment systems.

Therefore, one objective of the present invention is to provide a method and a system which may provide a high performance, and a good function, under varying conditions.

This objective is achieved through the method, exhaust treatment system, and computer program product discussed herein.

The present invention provides for a treatment of an exhaust stream, resulting from a combustion in a combustion engine. Such exhaust stream comprises nitrogen oxides $NO_x$, in which at least nitrogen monoxide NO and nitrogen dioxide $NO_2$ are comprised. The exhaust stream passes through an exhaust treatment system connected to the combustion engine.

In the exhaust treatment system an oxidation of compounds comprising one or several of nitrogen, carbon and hydrogen in the exhaust stream occurs. Such oxidation is carried out by at least one oxidizing component arranged in the exhaust treatment system.

Furthermore, a reduction is carried out of an amount of nitrogen oxides $NO_x$, which reduction reaches a reduction catalyst device arranged downstream of the at least one oxidizing component in the exhaust treatment system. Such reduction is carried out through a catalytic reaction in the reduction catalyst device with the use of an additive.

According to the present invention a value is determined $(NO_2/NO_x)_{det}$ for a ratio between an amount of nitrogen dioxide $NO_2$ reaching a reduction catalyst device, and the amount of nitrogen oxides $NO_x$ reaching the reduction catalyst device.

An active control of at least one parameter related to the combustion engine is carried out, according to the present invention, based on the determined value $(NO_2/NO_x)_{det}$ for the ratio. This active control is carried out so that the amount of nitrogen oxides $NO_x$ reaching the at least one oxidizing component, and therefore also the reduction catalyst device, is increased if the determined value $(NO_2/NO_x)_{det}$ for the ratio exceeds an upper threshold value $(NO_2/NO_x)_{threshold\_high}$; $(NO_2/NO_x)_{det} > (NO_2/NO_x)_{threshold\_high}$.

Thus, with the use of the present invention, the combustion engine is controlled to increase the amount of nitrogen oxides $NO_x$, which is emitted from the combustion engine and reaches the at least one oxidizing component, and therefore also the reduction catalyst device, if the determined value $(NO_2/NO_x)_{det}$ for the ratio is too high. Such increase of the amount of nitrogen oxides $NO_x$ means that the value for the ratio $NO_2/NO_x$ decreases, since the amount of nitrogen oxides $NO_x$ is comprised in the denominator in the expression for the ratio, and $NO_2$ does not increase to the same extent, which means that a more efficient reduction may be obtained with the reduction catalyst device.

The active control of the combustion engine according to the present invention means that the fraction of the total conversion of nitrogen oxides $NO_x$ occurring via a fast reaction path, that is to say via fast SCR, wherein the reduction occurs via reaction paths over both nitrogen oxide NO and nitrogen dioxide $NO_2$, may be increased for some operating modes. Accordingly, the volume requirements relating to the catalyst may also be reduced. The reaction uses, at fast SCR, equal parts of nitrogen monoxide NO and nitrogen dioxide $NO_2$, which means that it is important to be able to control the molar ratio, $NO_2/NO_x$, towards a suitable value, for example a value close to 0.5 (50%).

By way of a suitably selected active control of the combustion engine according to the present invention, the volume requirements relating to the catalyst may also be reduced, since the utilization is improved.

The use of the present invention also results in a reduced consumption of additive. Additionally, a slip of $NO_x$ from the vehicle, in the form of $NO_2$, is reduced.

The exhaust treatment system also becomes less sluggish and easier to control/regulate if the present invention is used, which means that a more accurate control of the supply of additive may be carried out.

Additionally, the active control of the combustion engine according to the present invention, which is here carried out primarily in order to optimize the $NO_x$-conversion, also results in a reduced fuel consumption for the vehicle as a positive by-effect.

The present invention may also advantageously be used in hybrid vehicles. The hybrid system may then result in an increased flexibility for the control of the ratio $NO_2/NO_x$.

Through the use of the present invention a better fuel optimization may be obtained for the vehicle, since there is thus potential to control the engine in a more fuel efficient manner, so that a higher efficiency for the engine is obtained. Thus, a performance gain and/or a reduced emission of carbon dioxide $CO_2$ may be obtained when the present invention is used.

Through the use of the present invention, the fraction of nitrogen oxides $NO_x$ consisting of nitrogen dioxide $NO_2$ may be actively controlled, which is facilitated by an active control of the amount of nitrogen oxides $NO_x$ upstream of at least one substrate with oxidizing coating, for example comprising precious metals, in the exhaust treatment system. This control of the ratio $NO_2/NO_x$ may, apart from advantages in catalytic performance, such as higher $NO_x$-conversion, also provide for a possibility of specifically reducing emissions of nitrogen dioxide $NO_2$, which result in a very poisonous and strong smelling emission. This may result in advantages at a potential future introduction of a separate regulatory requirement relating to nitrogen dioxide $NO_2$, via a possibility of reducing emissions of nitrogen dioxide $NO_2$. This may be compared with for example the Euro VI-system, in which the fraction of nitrogen dioxide $NO_2$ provided at exhaust purification may not be directly impacted in the exhaust treatment system itself, since the fraction of nitrogen dioxide $NO_2$ in the Euro VI-system is dependent on usage/operation, and may not be controlled in any other way.

The present invention also has an advantage in that two cooperating dosage devices are used in combination for the dosage of a reductant, for example urea, upstream of the first and second devices, which relieves and facilitates mixture and potential vaporization of the reductant, since the injection of the reductant is divided between two physically separate positions. This reduces the risk of the reductant cooling down the exhaust treatment system locally, which may potentially form deposits at the positions where the reductant is injected, or downstream of such positions.

BRIEF LIST OF FIGURES

The invention will be illustrated in more detail below, along with the enclosed drawings, where similar references are used for similar parts, and where.

DESCRIPTION OF PREFERRED EMBODIMENTS

Figure 1:
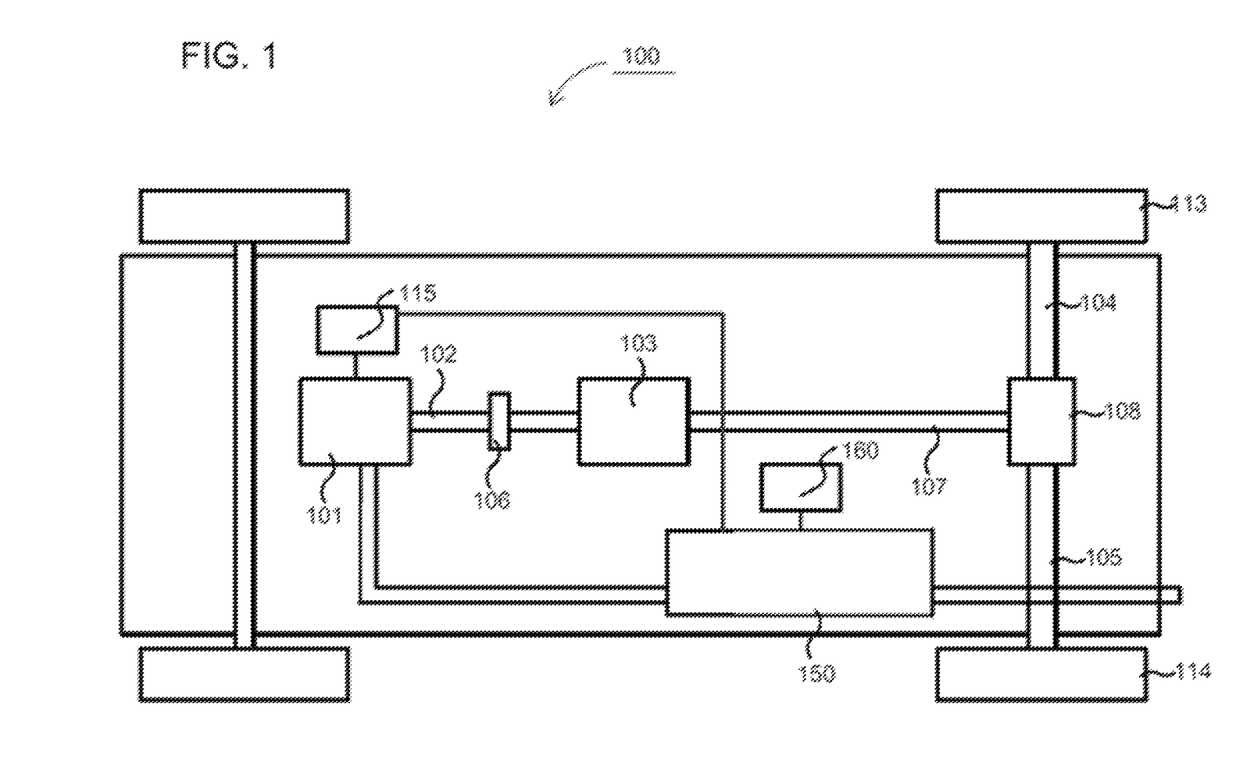
FIG. 1 shows an example vehicle which may comprise the present invention.

FIG. 1 schematically shows an example vehicle 100, comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the vehicle's control system via a control device 115, which may be connected to the exhaust treatment system 150. Likewise, the clutch 106 and the gearbox 103 may be controlled by the vehicle's control system with the help of one or more applicable control devices (not shown). Naturally, the vehicle's driveline may also be of another type, such as a type with a conventional automatic gearbox, of a type with a hybrid driveline, etc.

An output shaft 107 from the gearbox 103 drives the wheels 113, 114 via a final drive 108, such as e.g. a customary differential, and the drive shafts 104, 105 connected to the said final drive 108.

The vehicle 100 also comprises an exhaust treatment system/exhaust purification system 150 for treatment/purification of exhaust emissions resulting from combustion in the combustion chamber of the combustion engine 101, which may consist of cylinders. The exhaust treatment system 150 may be controlled by the vehicle's control system, via a control device 160.

According to the present invention, a method is provided for the treatment of an exhaust stream, which results from a combustion in a combustion engine and comprises nitrogen oxides $NO_x$. Nitrogen oxides comprise at least nitrogen monoxide $NO$ and nitrogen dioxide $NO_2$. The exhaust stream passes through an exhaust treatment system connected to the combustion engine.

Figure 2A:
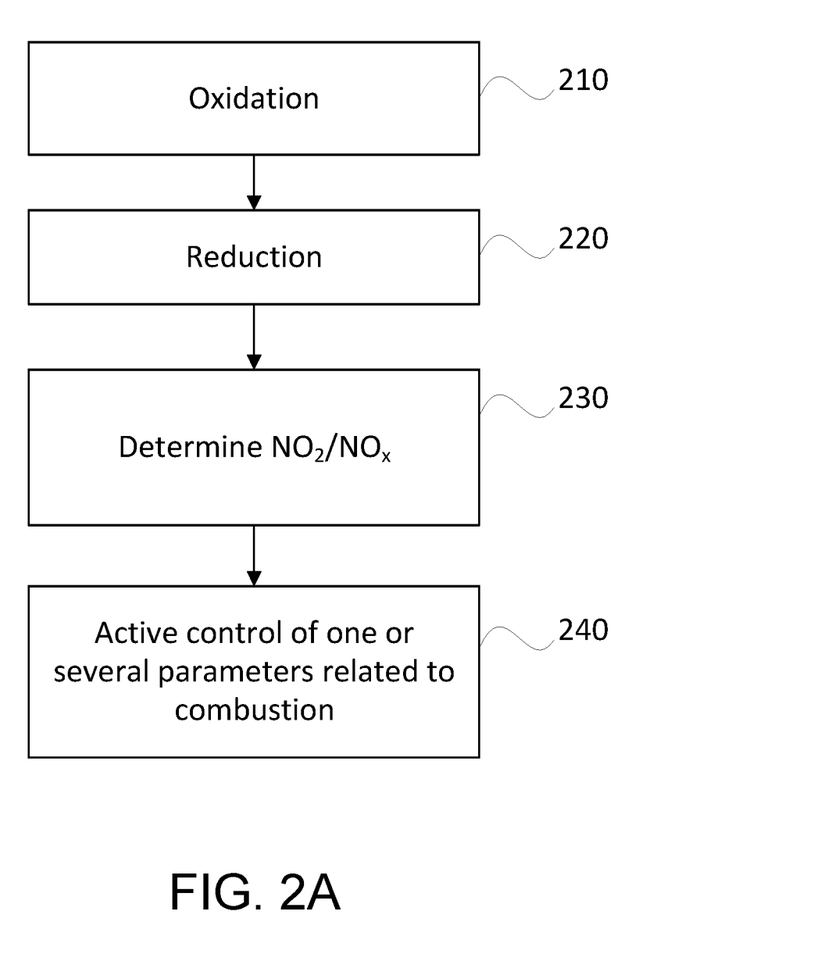
FIGS. 2a and 2b show a flow chart for the method for exhaust treatment according to the present invention.

This method may be illustrated with the flow chart in FIG. 2a.

In a first step 210 of the method, an oxidation of compounds comprising one or several of nitrogen, carbon and hydrogen is carried out in the exhaust stream. Such oxidation is carried out by at least one oxidizing component arranged in the exhaust treatment system.

In a second step 220 of the method, a reduction of an amount of nitrogen oxides $NO_x$, which reaches a reduction catalyst device arranged downstream of the oxidizing component in the exhaust treatment system, is carried out. Such reduction is carried out through a catalytic reaction in the reduction catalyst device with the use of an additive.

In a third step 230 of the method, according to the present invention, a value $(NO_2/NO_x)_{det}$ is determined for a ratio between an amount of nitrogen dioxide $NO_2$ reaching the reduction catalyst device, and the amount of nitrogen oxides $NO_x$ reaching the reduction catalyst device.

In a fourth step 240 of the method, an active control of at least one parameter related to the combustion engine is carried out. This at least one parameter may, for example, be related to a combustion in the combustion engine. According to the present invention, this active control is carried out based on the determined value $(NO_2/NO_x)_{det}$ for the ratio, so that the amount of nitrogen oxides $NO_x$ reaching the reduction catalyst device increases, if the determined value $(NO_2/NO_x)_{det}$ for the ratio exceeds an upper threshold value $(NO_2/NO_x)_{threshold\_high}$; $(NO_2/NO_x)_{det} > (NO_2/NO_x)_{threshold\_high}$.

Figure 2B:
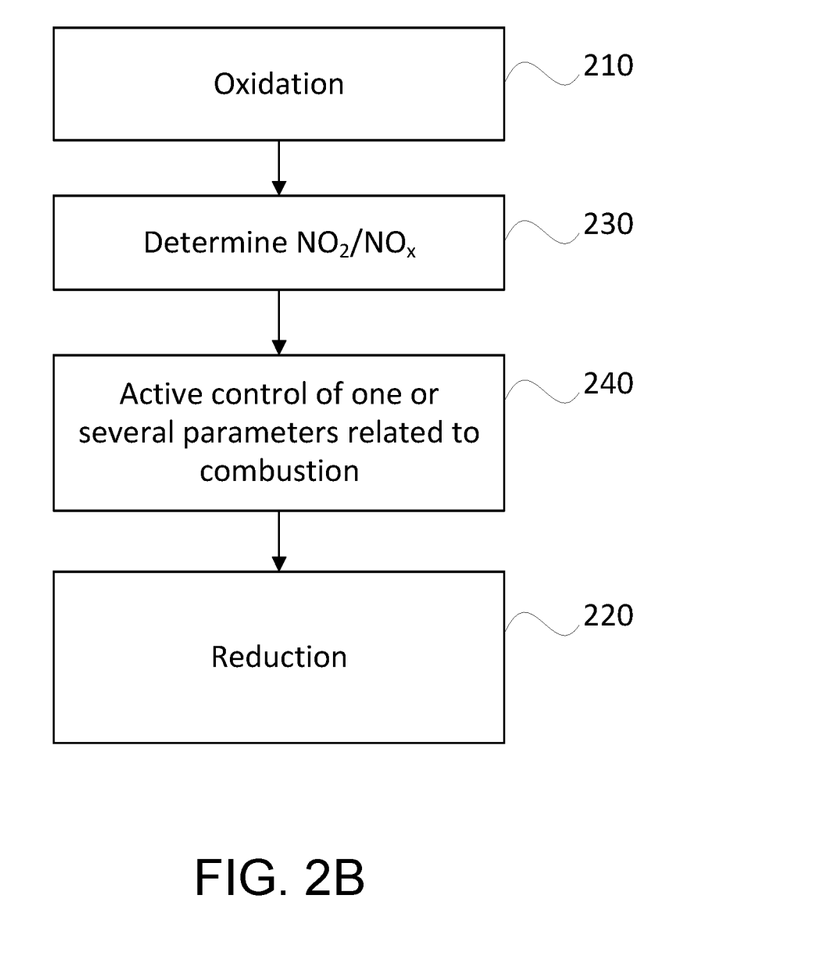

The first 210, second 220, third 230 and fourth 240 steps illustrated in FIG. 2a may, according to the present invention, also be carried out in an order which is at least partly different than the one illustrated in FIG. 2a. For example, the third 230 and fourth 240 steps may be carried out between the first 210 and second 220 steps, as shown in FIG. 2b.

Through the use of the present invention, the combustion engine may be controlled to increase the amount of nitrogen oxides $NO_x$ emitted by it, if the determined value $(NO_2/NO_x)_{det}$ for the ratio is too high. Such an increase of the amount of nitrogen oxides $NO_x$ means that the value for the ratio $NO_2/NO_x$ decreases, so that the fraction of the total conversion of nitrogen oxides $NO_x$, occurring via a fast reaction path, may be increased. Additionally, by way of the active control of the combustion engine, according to the present invention the volume requirements relating to the catalyst may also be reduced, since the utilization is improved.

As described above, according to the present invention an active control 240 is carried out of at least one parameter related to the combustion in the engine, in order to achieve a desirable value for the ratio $NO_2/NO_x$, between the amount of nitrogen dioxide $NO_2$ and the amount of nitrogen oxides $NO_x$, which reach the reduction catalyst device. This active control may be carried out in a number of different ways, according to different embodiments of the present invention.

According to a couple of embodiments of the present invention, the active control comprises a selection of at least one injection strategy for the combustion engine.

According to one embodiment of the present invention, the timing of fuel injections into the respective cylinders in the combustion engine may be controlled, so that an increase of the amount of nitrogen oxides $NO_x$ reaching the at least one oxidizing component, and therefore also the reduction catalyst device, is achieved. This increase may be achieved by advancing the timing of one or several of the injections. This increase of the amount of nitrogen oxides $NO_x$ results in a reduction of the value for the ratio $NO_2/NO_x$.

Similarly, the timing for fuel injections into the respective cylinders in the combustion engine may be controlled, so that a reduction of the amount of nitrogen oxides $NO_x$ reaching the reduction catalyst device is achieved. This increase may be achieved by postponing the timing of one or several of the injections. This reduction of the amount of nitrogen oxides $NO_x$ results in an increase of the value for the ratio $NO_2/NO_x$.

According to one embodiment of the present invention, the injection pressure for the fuel injections into the respective cylinders in the combustion engine may be controlled, so that an increase of the amount of nitrogen oxides $NO_x$ reaching the reduction catalyst device is achieved. This increase may be achieved by way of an increase of the injection pressure for one or several cylinders. This increase of the amount of nitrogen oxides $NO_x$ results in a reduction of the value for the ratio $NO_2/NO_x$.

Similarly, the injection pressure for the injections of fuel into the respective cylinders of the combustion engine may be controlled, so that a reduction of the amount of nitrogen oxides $NO_x$ reaching the reduction catalyst device is achieved. This reduction may be achieved by way of a reduction of the injection pressure for one or several cylinders. This reduction of the amount of nitrogen oxides $NO_x$ results in an increase of the value for the ratio $NO_2/NO_x$.

According to one embodiment of the present invention, an injection phasing for an injection of fuel into the respective cylinders may be controlled, so that an increase of the amount of nitrogen oxides $NO_x$ reaching the reduction catalyst device is achieved. The increase may be achieved by way of controlling an injection phasing, so that it results in a relatively large pressure gradient. This increase of the amount of nitrogen oxides $NO_x$ results in a reduction of the value for the ratio $NO_2/NO_x$.

Injection phasing, as the term is used herein, means how the injection changes over time, for example how the pressure for the injection changes over time. A measure of injection phasing may for example be a time derivative for the cylinder pressure.

Similarly, an injection phasing for an injection of fuel into the respective cylinders may be controlled, so that a reduction of the amount of nitrogen oxides $NO_x$ reaching the reduction catalyst device is achieved. This reduction may be achieved by way of control of the injection phasing, so that it results in a relatively small pressure gradient with respect to the cylinder pressure. This reduction of the amount of nitrogen oxides $NO_x$ results in an increase of the value for the ratio $NO_2/NO_x$.

According to one embodiment of the present invention, the active control of the at least one combustion related parameter comprises a control of a device for exchange gas recirculation (EGR). Combustion engines are supplied with air at an inlet, to achieve a gas mixture which is suitable for combustion, together with fuel that is also supplied to the engine. The combustion takes place in the engine's cylinders, wherein the gas mixture is burned. The combustion generates exhausts, which leave the engine at an outlet. The exhaust recirculation conduit is arranged from the engine's outlet to its inlet, and leads back a part of the exhausts from the outlet to the inlet. Thus, the suction losses at the air intake may be reduced, and nitrogen oxides $NO_x$ emitted from the engine may be adjusted.

According to one embodiment of the present invention, an increase of the amount of nitrogen oxides $NO_x$ reaching the reduction catalyst device may be achieved by reducing a fraction of the exhaust stream, which is recirculated through the device for exhaust recirculation (EGR). This increase of the amount of nitrogen oxides $NO_x$ results in a reduction of the value for the ratio $NO_2/NO_x$.

Similarly, a reduction of the amount of nitrogen oxides $NO_x$ reaching the reduction catalyst device may be achieved by increasing a fraction of the exhaust stream, which is recirculated through the device for exhaust recirculation (EGR). This reduction of the amount of nitrogen oxides $NO_x$ results in an increase of the value for the ratio $NO_2/NO_x$.

The determined value $(NO_2/NO_x)_{det}$ for the ratio between the amount of nitrogen dioxide $NO_2$ and the amount of nitrogen oxides $NO_x$ reaching the reduction catalyst device may, for example, consist of a measured, predicted and/or modeled value for the ratio, wherein the measurement, prediction and/or modeling can take into account the current operating and/or driving mode, characteristics of the road section in which the vehicle is located, characteristics of the combustion engine and/or characteristics of the fuel used to drive the combustion engine. The measurement, prediction and/or modeling may also take into account how the vehicle is driven, such as to the torque requested by a driver and/or a cruise control, and to the driver's driving style.

The determined value $(NO_2/NO_x)_{det}$ for the ratio between the amount of nitrogen dioxide $NO_2$ and the amount of nitrogen oxides $NO_x$ reaching the reduction catalyst device may also consist of a measured value, which is measured through the use of one or several $NO_x$-sensors, and/or $NO_2$-sensors, arranged in the exhaust treatment system.

According to one embodiment of the present invention, the active control 240 of the at least one parameter related to a combustion in the combustion engine is implemented in such a way that the amount of nitrogen oxides $NO_x$ reaching the reduction catalyst device is reduced, if the determined value $(NO_2/NO_x)_{det}$ for the ratio is smaller than or equal to a lower threshold value $(NO_2/NO_x)_{threshold\_low}$, $(NO_2/NO_x)_{det} \leq (NO_2/NO_x)_{threshold\_low}$.

In this document, the invention is often described as active control, resulting in increases or reductions of the amount of nitrogen oxides $NO_x$ reaching the at least one oxidizing component, and therefore also the reduction catalyst device.

Such an increase of the amount of nitrogen oxides $NO_x$ reaching the reduction catalyst device may entail that the amount of nitrogen oxides $NO_x$ reaching the reduction catalyst device is greater than an amount of nitrogen oxides $NO_x$, which is comprised in the determined value $(NO_2/NO_x)_{det}$ for the ratio. This may also be described as the amount of nitrogen oxides $NO_x$ reaching a reduction catalyst device having a higher concentration of nitrogen oxides $NO_x$ in the exhaust stream than a concentration of nitrogen oxides $NO_x$, which corresponds to the determined value $(NO_2/NO_x)_{det}$ for the ratio.

Such a reduction of the amount of nitrogen oxides $NO_x$ reaching the reduction catalyst device entails, in a similar manner, that the amount of nitrogen oxides $NO_x$ reaching the reduction catalyst device is smaller than an amount of nitrogen oxides $NO_x$, which is comprised in the determined value $(NO_2/NO_x)_{det}$ for the ratio. This may also be described as the amount of nitrogen oxides $NO_x$ reaching a reduction catalyst device having a lower concentration of nitrogen oxides $NO_x$ in the exhaust stream compared to a concentration of nitrogen oxides $NO_x$, which corresponds to the determined value $(NO_2/NO_x)_{det}$ for the ratio.

As described above, according to the present invention an active control of at least one parameter related to a combustion in the combustion engine is carried out, based on a comparison of a determined value $(NO_2/NO_x)_{det}$ for the ratio with an upper threshold value $(NO_2/NO_x)_{threshold\_high}$, and/or with a lower threshold value $(NO_2/NO_x)_{threshold\_low}$.

The lower threshold value $(NO_2/NO_x)_{threshold\_low}$ has, according to one embodiment, a value which depends on a temperature over the reduction catalyst device. As a non-limiting example, it may be mentioned that the lower threshold value $(NO_2/NO_x)_{threshold\_low}$ may have a value representing 50%, 45%, 30%, 20%, or 10% for the ratio.

Similarly, the upper threshold value $(NO_2/NO_x)_{threshold\_high}$ may have a value, which depends on a temperature over the reduction catalyst device. As a non-limiting example, it may be mentioned that the upper threshold value $(NO_2/NO_x)_{threshold\_high}$ may have a value representing 45%, 50%, 60%, or greater than 65% (>65%) for the ratio.

A person skilled in the art will realize that a method for treatment of an exhaust stream according to the present invention, may also be implemented in a computer program, which when executed in a computer will cause the computer to execute the method. The computer program usually consists of a part of a computer program product 403, where the computer program product comprises a suitable non-volatile/permanent/persistent/durable digital storage medium, on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
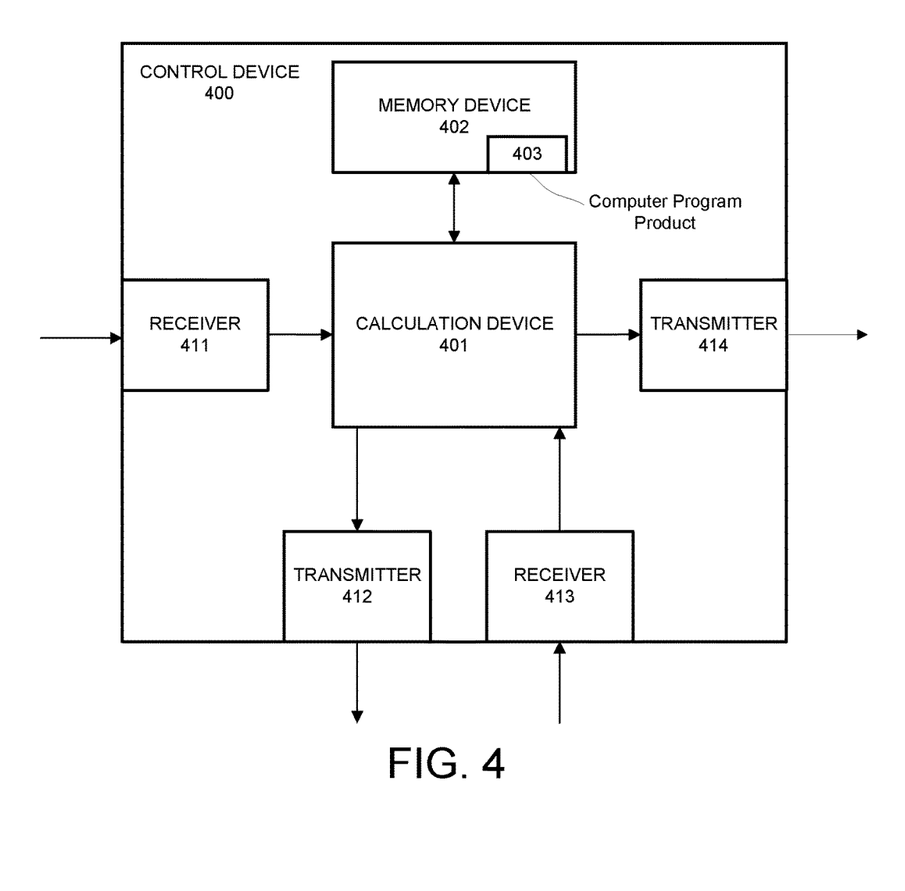
FIG. 4 shows a control device in which a method according to the present invention may be implemented.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals. These input and output signals may contain wave shapes, pulses or other attributes, which may be detected as information by the devices 411, 413 for the receipt of input signals and may be converted into signals that may be processed by the calculation device 401. These signals are then provided to the calculation device 401. The devices 412, 414 for sending output signals are arranged to convert the calculation result from the calculation unit 401 into output signals, for transfer to other parts of the vehicle's control system, and/or the component(s) for which the signals are intended, for example the first and/or second dosage devices.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment shown, is implemented in the control device 400. The invention may, however, also be implemented wholly or partly in one or several other control devices already existing in the vehicle, or in a control device dedicated to the present invention.

Here, and in this document, devices are often described as being arranged to carry out steps in the method according to the invention. This also comprises that the devices are adapted and/or set up to carry out these method steps.

Figure 3A:
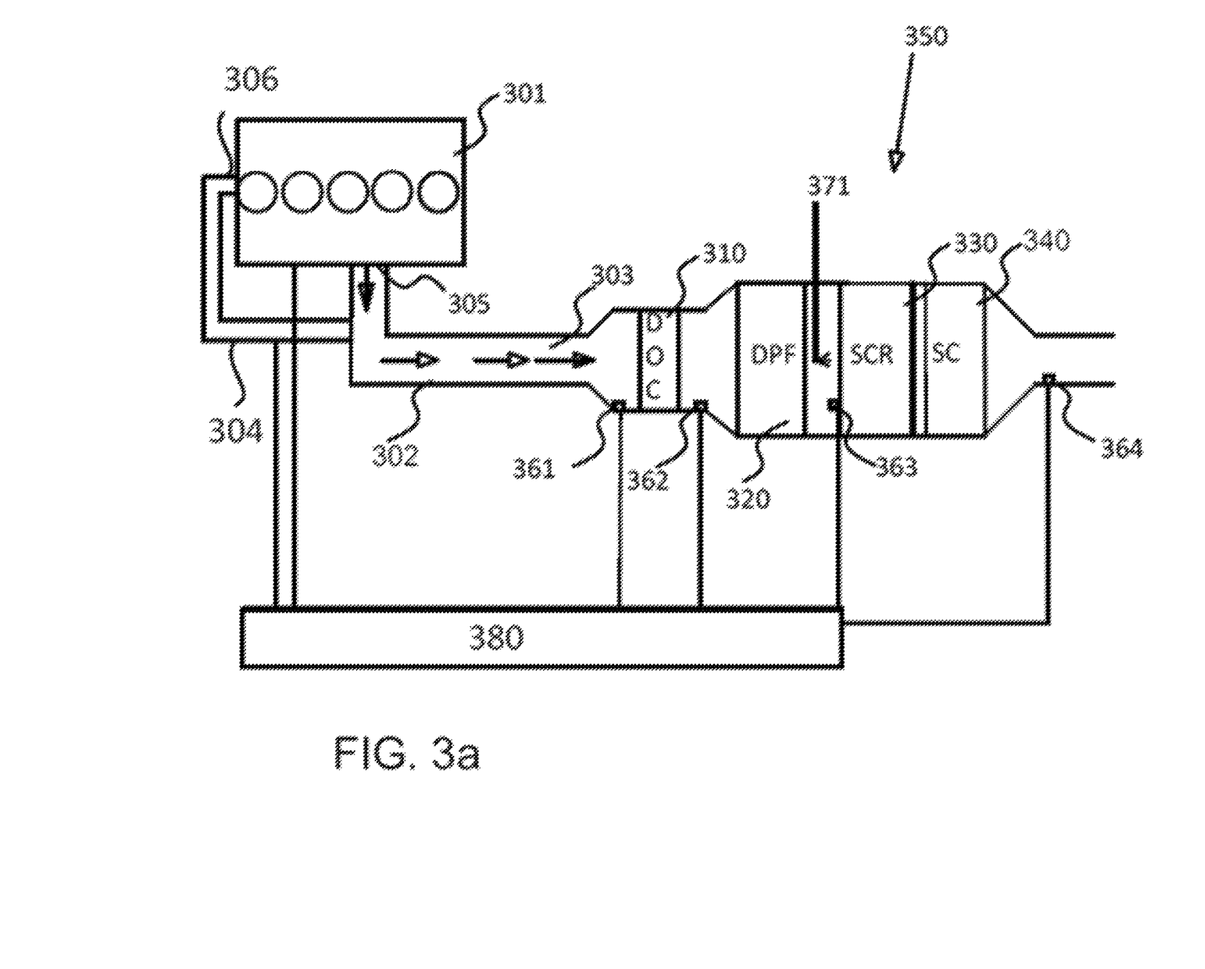
FIGS. 3a and 3b show examples of an exhaust treatment systems according to the present invention.
Figure 3B:
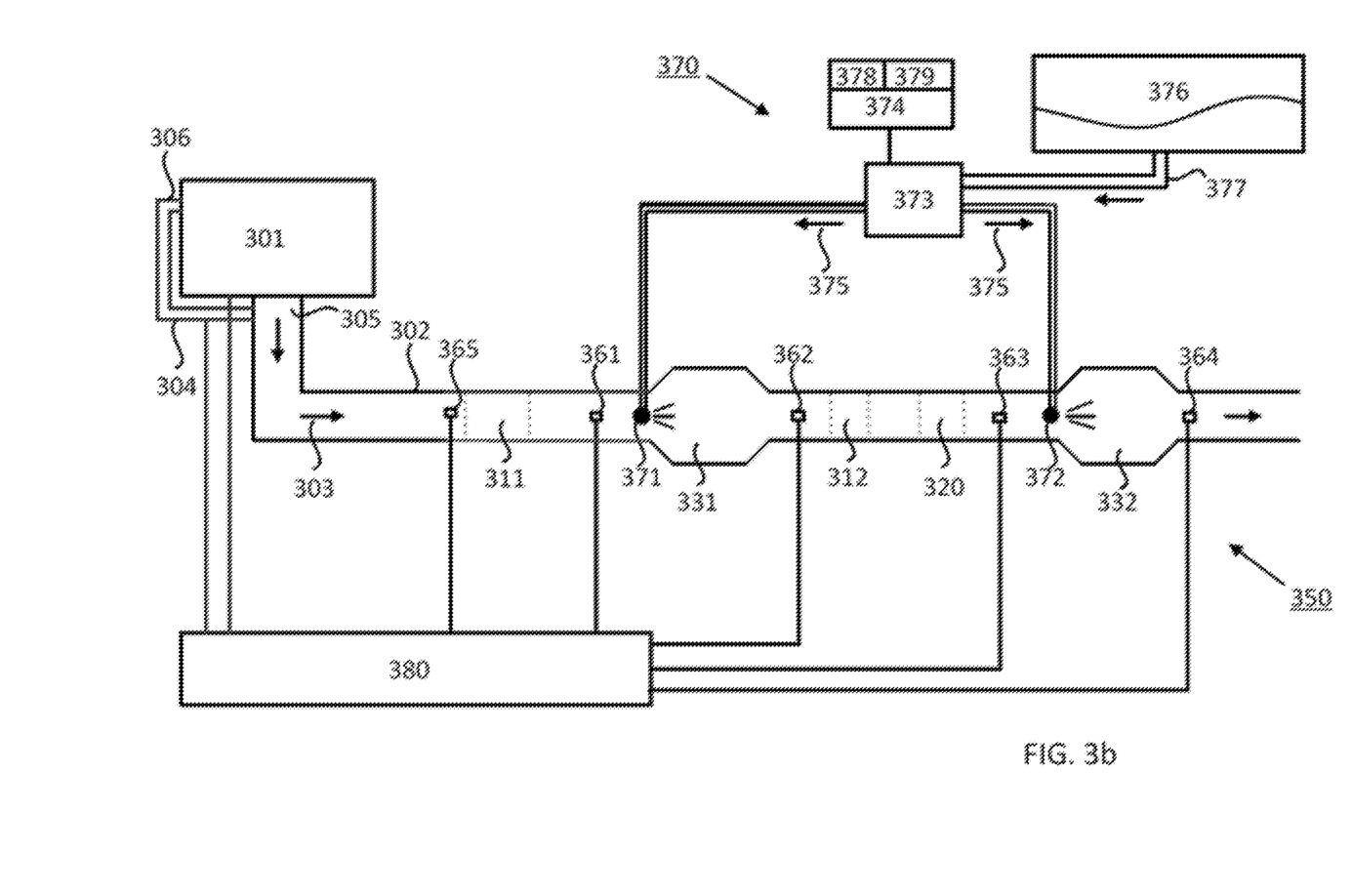

According to one aspect of the present invention, an exhaust treatment system is provided, arranged for the treatment of an exhaust stream, which results from a combustion in a combustion engine. The exhaust stream comprises nitrogen oxides $NO_x$, in which at least nitrogen monoxide NO and nitrogen dioxide $NO_2$ are comprised. FIGS. 3a and 3b schematically show two non-limiting examples of exhaust treatment systems 350, in which the method according to the present invention may be used. In FIGS. 3a and 3b similar devices have the same references.

The exhaust treatment system 350 according to the present invention, comprises at least one oxidizing component 310, 311, 312, 320 arranged in the exhaust treatment system 350, in order to carry out an oxidation 210 of compounds comprising one or several of nitrogen, carbon, and hydrogen in the exhaust stream 303.

The exhaust treatment system 350 according to the present invention also comprises at least one reduction catalyst device 330, 331, 332, arranged downstream of the oxidizing component 310, 311, 312, 320 in the exhaust treatment system 350, in order to carry out a reduction 220 of an amount of nitrogen oxides $NO_x$ reaching the reduction catalyst device 330, 331, 332. This reduction is carried out through a catalytic reaction using an additive 371, 372.

The exhaust treatment system 350 according to the present invention also comprises a control device 380, arranged to provide/carry out a determination 230 of a value $(NO_2/NO_x)_{det}$ for a ratio between an amount of nitrogen dioxide $NO_2$ reaching the reduction catalyst device 330, 331, 332, and the amount of nitrogen oxides $NO_x$ reaching the at least one oxidizing component 310, 311, 312, and therefore also the reduction catalyst device 330, 331, 332 as described above. The control device 380 is also arranged to carry out an active control 240 of at least one parameter related to the combustion engine 301, such as for example related to a combustion in the combustion engine, based on this determined value $(NO_2/NO_x)_{det}$ for the ratio. This active control 240 is carried out, so that the amount of nitrogen oxides $NO_x$ reaching the reduction catalyst device 330, 331, 332 is increased, if the determined value $(NO_2/NO_x)_{det}$ for the ratio exceeds an upper threshold value $(NO_2/NO_x)_{threshold\_high}$; $(NO_2/NO_x)_{det} > (NO_2/NO_x)_{threshold\_high}$.

As illustrated by FIGS. 3a and 3b, the exhaust treatment system 350 may have a number of different configurations, as long as it comprises the at least one oxidizing component 310, 311, 312, 320, and the at least one reduction catalyst device 330, 331, 332, downstream of the oxidizing component 310, 311, 312, 320, and the control device 380, which may achieve the active control of the combustion engine 301, so that the amount of nitrogen oxides $NO_x$ reaching the at least one oxidizing component 310, 311, 312, and therefore also the reduction catalyst device 330, 331, 332 may be adjusted.

In the systems displayed in FIGS. 3a and 3b, an exhaust pipe 302 is connected to a combustion engine 301.

FIG. 3a shows an exhaust treatment system 350, which may illustrate a so-called Euro VI-system. The exhaust stream 303 is led to a diesel particulate filter (DPF) 320, via a diesel oxidation catalyst (DOC) 310. During the combustion in the combustion engine, soot particles are formed, and the particulate filter DPF 320 is used to catch these soot particles. The exhaust stream 303 is here led through a filter structure, where soot particles are caught from the exhaust stream 303 passing through, and are stored in the particulate filter 320.

The oxidation catalyst DOC 310 constitutes, according to this embodiment, the oxidizing component 310, and is normally used primarily to oxidize, during the exhaust treatment, remaining hydrocarbons $C_xH_y$ (also referred to as HC) and carbon monoxide CO in the exhaust stream 303 into carbon dioxide $CO_2$ and water $H_2O$. The oxidation catalyst DOC 310 may also oxidize a large fraction of the nitrogen monoxides NO occurring in the exhaust stream into nitrogen dioxide $NO_2$. The oxidation of nitrogen monoxide NO into nitrogen dioxide $NO_2$ is important to the nitrogen dioxide based soot oxidation in the filter, and is also advantageous at a potential subsequent reduction of nitrogen oxides $NO_x$. In this respect, the exhaust treatment system 350 comprises an SCR (Selective Catalytic Reduction) catalyst 330, arranged downstream of the particulate filter DPF 320, and here constitute the reduction catalyst device 330. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted by the ratio between nitrogen monoxide NO and nitrogen dioxide $NO_2$ in the exhaust stream, so that the reduction's reaction is impacted in a positive direction by the previous oxidation of NO into $NO_2$ in the oxidation catalyst DOC. This applies up to a value representing approximately 50% of the molar ratio $NO_2/NO_x$. For higher fractions of the molar ratio $NO_2/NO_x$, that is to say for values exceeding 50%, the reaction speed is impacted in a strongly negative manner. This problem is resolved by the present invention.

The SCR-catalyst 330 requires an additive to reduce the concentration of nitrogen oxides $NO_x$ in the exhaust stream 303. Such additive is injected into the exhaust stream 371 upstream of the SCR-catalyst 330. Such additive is often ammonia and/or urea based, or consists of a substance from which ammonia may be extracted or released, and may for example consist of AdBlue, which basically consists of urea mixed with water. Urea forms ammonia at heating (thermolysis), and at heterogeneous catalysis on an oxidizing surface (hydrolysis), which surface may, for example, consist of titanium dioxide $TiO_2$, within the SCR-catalyst, or of a dedicated hydrolysis catalyst downstream of the dosage device.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are then used to increase the speed of the decomposition of urea into ammonia, and/or to mix the additive with the emissions, and/or to vaporize the additive.

The exhaust treatment system 350 is also equipped with a slip-catalyst (SC), which is arranged to oxidize a surplus of additive that may remain after the SCR-catalyst 330, and/or to assist the SCR-catalyst with additional $NO_x$-reduction. Accordingly, the slip-catalyst SC may provide a potential for improving the system's total conversion/reduction of NOx.

The exhaust treatment system 350 is also equipped with one or several sensors, such as one or several $NO_x$-, $NO_2$- and/or temperature sensors 361, 362, 363, 364, arranged for example at the inlet to the oxidation catalyst 310, at the inlet to the particulate filter 320, at the inlet to the SCR-catalyst 330, and/or at the outlet from the slip-catalyst 340, for determination of nitrogen oxides and/or temperatures in the exhaust treatment system.

The control device 380 is arranged to carry out an active control of one or several parameters, which are related to the combustion in the combustion engine 301. This control may be based on signals from a number of sensors in the exhaust treatment system, among others on the one or several of the $NO_x$-, $NO_2$- and/or the temperature sensors 361, 362, 363, 364.

FIG. 3b shows an exhaust treatment system 350, which comprises two reduction catalyst devices 331, 332. Exhausts generated at combustion in the engine 301, that is to say the exhaust stream 303 (indicated with arrows), are led past a first dosage device 371, arranged in the exhaust treatment system 350 to provide a first supply 210 of a first additive to the exhaust stream 303. The exhaust treatment system 350 comprises a first reduction catalyst device 331, arranged downstream of the first dosage device 371, and arranged to provide a first impact on a first amount of nitrogen oxides $NO_{x\_1}$ reaching the first device 331. At this first impact, which occurs in the first device 331, the first additive is used, which is supplied to the exhaust stream 303.

The exhaust treatment system 350 also comprises a second dosage device 372, arranged downstream of the first device 331 to provide a second supply of a second additive to the exhaust stream 303. Downstream of the second dosage device 372, a second reduction catalyst device 332 is arranged, in order to provide a second impact on a second amount of nitrogen oxides $NO_{x\_2}$ reaching the second device 332. At this second impact, the first and/or the second additive is used, which is supplied to the exhaust stream by the second dosage device 372.

For the exhaust treatment system 350 in FIG. 3b, the ratio $NO_2/NO_x$, between the amount of nitrogen dioxide $NO_2$ and the amount of nitrogen oxides $NO_x$ reaching the reduction catalyst device 330, 331, 332 may consist of a ratio $NO_{2\_1}/NO_{x\_1}$, between the first amount of nitrogen dioxide $NO_{2\_1}$ and the first amount of nitrogen oxides $NO_{x\_1}$ reaching the reduction catalyst device 331. For the exhaust treatment system 350 in FIG. 3b, the ratio $NO_2/NO_x$, between the amount of nitrogen dioxide $NO_2$ and the amount of nitrogen oxides $NO_x$ reaching the reduction catalyst device 330, 331, 332 may consist of a ratio $NO_{2\_2}/NO_{x\_2}$, between the second amount of nitrogen dioxide $NO_{2\_2}$ and the second amount of nitrogen oxides $NO_{x\_2}$ reaching the second reduction catalyst device 332.

The exhaust treatment system 350 is also equipped with one or several sensors, such as one or several $NO_x$-, $NO_2$- and/or temperature sensors 361, 362, 363, 364, 365, arranged, for example, at the inlet to the oxidation catalyst 311, at the inlet to the first reduction catalyst device 331, at the outlet from the first reduction catalyst device 331, at the inlet to the oxidation catalyst 312, at the inlet to the second reduction catalyst device 372, and/or at the outlet from the second reduction catalyst device 332, for determination of nitrogen oxides, nitrogen dioxide and/or temperatures in the exhaust treatment system.

The control device 380 is arranged to carry out an active control of one or several parameters, which are related to the combustion in the combustion engine 301 according to the present invention. This control may be based on signals from a number of sensors in the exhaust treatment system, among others on the one or several of the $NO_x$-, $NO_2$- and/or the temperature sensors 361, 362, 363, 364, 365.

According to one embodiment of the present invention, the exhaust treatment system may comprise a first oxidation catalyst $DOC_1$ 311, arranged upstream of the first dosage device 371 and/or a second oxidation catalyst $DOC_2$ 312, arranged downstream of the first device 331. The first oxidation catalyst $DOC_1$ 311, and/or the second oxidation catalyst $DOC_2$ 312, are in that case arranged to oxidize nitrogen compounds, carbon compounds and/or hydrocarbon compounds in the exhaust stream 303 in the exhaust treatment system 350. At the oxidation in the first oxidation catalyst $DOC_1$ 311, a part of the nitrogen monoxides NO in the exhaust stream 303 is oxidized into nitrogen dioxide $NO_2$.

The first oxidation catalyst $DOC_1$ 311, and/or the second oxidation catalyst $DOC_2$ 312, are at least partly coated with a catalytic oxidizing coating, wherein such oxidizing coating may comprise at least one precious metal, for example platinum.

According to one embodiment of the present invention, the exhaust system 350 comprises a particulate filter 320, downstream of the first device, or downstream of the second oxidation catalyst $DOC_2$ 312, if this is comprised in the system. The particulate filter 320 is arranged to catch and oxidize soot particles. The exhaust stream 303 is here led through the filter structure of the particulate filter, where soot particles are caught in the filter structure from the exhaust stream 303 passing through, and are stored and oxidized in the particulate filter. According to one embodiment of the present invention, the particulate filter 320 consists of a Diesel Particulate Filter, DPF. This filter is thus used to catch, store and oxidize soot particles from the exhaust stream 303.

According to another embodiment of the present invention, the particulate filter 320 consists of a particulate filter, which at least partly is coated with a catalytic oxidizing coating, wherein such oxidizing coating may comprise at least one precious metal. That is to say, the particulate filter 320 may at least partly be coated with one or several precious metals, for example platinum. The particulate filter cDPF, which comprises the oxidizing coating, may result in more stable ratios for the nitrogen dioxide level $NO_2$ at the second reduction catalyst device 332. Additionally, the use of the particulate filter cDPF, comprising the oxidizing coating, means that the value for the ratio $NO_2/NO_x$, that is to say the level of $NO_2$, may be controlled. Since the particulate filter cDPF with the oxidizing coating is used, according to one embodiment the second oxidation catalyst $DOC_2$ 312 is not needed in the system.

Thus, the at least one oxidizing component 310, 311, 312, 320, which according to the present invention is arranged upstream of the reduction catalyst device 330, 331, 332, may comprise one or several of an oxidation catalyst 310, 311, 312, and a particulate filter 320 at least partly comprising a catalytic oxidizing coating.

As described above, according to the present invention, an active control 240 of at least one parameter related to the combustion in the engine 301 is implemented to achieve a desirable value for the ratio between the amount of nitrogen dioxide $NO_2$, and the amount of nitrogen oxides $NO_x$ reaching the reduction catalyst device 330, 331, 332. This active control may be carried out in a number of different ways, according to different embodiments of the present invention.

The active control of the at least one parameter related to the combustion in the engine 301 may according to one embodiment of the present invention comprise a selection of at least one injection strategy for the combustion engine 301. In FIGS. 3a and 3b the control device 380 is schematically drawn as connected to the engine 301. This connection means that the control device 380 is arranged to better be able to control the injection of fuel into the combustion engine's cylinders, either directly or via an engine control device 115 (FIG. 1).

According to one embodiment of the present invention, a timing for an injection of fuel into the respective cylinders in the combustion engine 301 may be controlled by the control device 380 to occur earlier, so that an increase of the amount of nitrogen oxides $NO_x$ reaching the reduction catalyst device 330, 331, 332 is achieved by advancing the timing of the injection. Similarly, a reduction of the amount of nitrogen oxides $NO_x$ reaching the reduction catalyst device 330, 331, 332 may be achieved by delaying the timing of the injection.

According to one embodiment of the present invention, as described above, the injection pressure for the injections of fuel into the respective cylinders in the combustion engine may be controlled by the control device 380, so that an increase of the injection pressure is achieved for one or several cylinders, wherein an increase of the amount of nitrogen oxides $NO_x$ reaching the reduction catalyst device 330, 331, 332 is achieved. Similarly, the injection pressure for the injections of fuel into the respective cylinders of the combustion engine 301 may be controlled, so that a reduction of the amount of nitrogen oxides $NO_x$ reaching the reduction catalyst device 330, 331, 332 is achieved.

According to one embodiment of the present invention, as described above, the injection phasing for an injection of fuel into the respective cylinders may be controlled by the control device 380, so that a relatively large pressure gradient is obtained, wherein an increase of the amount of nitrogen oxides $NO_x$ reaching the reduction catalyst device is achieved. Similarly, the injection may be controlled, so that a relatively small cylinder pressure gradient is obtained, wherein a reduction of the amount of nitrogen oxides $NO_x$ reaching the reduction catalyst device 330, 331, 332 is achieved.

As described above, according to one embodiment of the present invention, the active control of the at least one combustion related parameter may comprise the control device 380 controlling a device for exchange gas recirculation (EGR) 304. This is schematically illustrated in FIGS. 3a and 3b by way of a connection between the control device 380, and the exchange gas recirculation device 304. This connection illustrates that the control device 380 may, either directly, via, for example, an engine control device 115 (FIG. 1), control the fraction of the exhaust stream 303 that is recirculated from the engine's outlet 305 to its inlet 306. For example, the control device 380 may here be arranged to control a damper or similar in the EGR-recirculation device 304, which impacts the amount of exhausts recirculated to the inlet 306.

According to one embodiment of the present invention, the control device 380 may be arranged to reduce a fraction of the exhaust stream, which is recirculated through the device for exhaust recirculation (EGR), so that an increase of the amount of nitrogen oxides $NO_x$ reaching the reduction catalyst device 330, 331, 332 is achieved. Similarly, an increase of a fraction of the exhaust stream, which is recirculated through the exchange gas recirculation device (EGR), may provide for a reduction of the amount of nitrogen oxides $NO_x$ reaching the reduction catalyst device 330, 331, 332.

According to one embodiment of the present invention, the first and/or the second additive comprises ammonia $NH_3$ or urea, from which ammonia may be generated/formed/released. This additive may for example consist of AdBlue. The first and the second additive may be of the same type, or may be of different types.

According to one embodiment of the present invention, the exhaust treatment system 350 comprises a system 370 for supply of additive, which comprises at least one pump 373 arranged to supply the dosage device 371 in FIG. 3a, and the first 371 and the second 372 dosage devices in FIG. 3b, respectively, with additive, that is to say for example ammonia or urea.

One example of such a system 370 for supply of additive is shown schematically in FIG. 3b, wherein the system comprises the first dosage device 371 and the second dosage device 372, which are arranged upstream of the first device 331, and upstream of the second device 332, respectively. The first and second dosage devices 371, 372, often consisting of dosage nozzles which administer additive to, and mix such additive with, the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized that the additive may be in liquid form and/or in gaseous form. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature, to avoid precipitates and formation of unwanted by-products, such as ammonium nitrate $NH_4NO_3$. An example of a value for such a lower threshold temperature may be approximately 200° C. According to one embodiment of the invention, the system 370 for supply of additive comprises a dosage control device 374, arranged to control the at least one pump 373, so that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, so that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage to each one of the first 331 and second 332 reduction catalyst devices, and accordingly also the function for each of the first 331 and second 332 reduction catalyst devices, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for control of supply of additive, so that a desired amount is injected into the exhaust stream 303 with the help of the first 371 and the second 372 dosage devices, respectively, upstream of the first 331 and the second 332 device, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The exhaust treatment system 350 in which the present invention is implemented may have a large number of designs. As mentioned above, the exhaust treatment system may have basically any appearance, as long as it comprises at least one oxidizing component, followed downstream by at least one reduction catalyst device 330, 331, 332, and wherein the combustion engine 301 may be controlled by a control device 380, to change the amount of nitrogen oxides $NO_x$ reaching the at least one oxidizing component 310, 311, 312, and therefore also the at least one reduction catalyst device 330, 331, 332.

The at least one reduction catalyst device 330, 331, 332 may for example, according to various non-limiting embodiments of the present invention comprise one of:

a selective catalytic reduction catalyst SCR;

a selective catalytic reduction catalyst SCR, followed downstream by a slip-catalyst SC, wherein the slip-catalyst SC is arranged to oxidize a residue of additive, and/or to assist the selective catalytic reduction catalyst SCR with an additional reduction of nitrogen oxides $NO_x$ in the exhaust stream 303;

a slip-catalyst SC, which is arranged primarily for reduction of nitrogen oxides $NO_x$, and secondarily for oxidation of additive in the exhaust stream 303;—a slip-catalyst SC, followed downstream of a selective catalytic reduction catalyst SCR, wherein the slip-catalyst SC is arranged to oxidize additive, and/or to assist the selective catalytic reduction catalyst SCR with a reduction of nitrogen oxides $NO_x$ in the exhaust stream 303;

a slip-catalyst SC, followed downstream by a selective catalytic reduction catalyst SCR, followed downstream by an additional slip-catalyst $SC_b$, wherein the slip-catalyst SC, and/or the additional slip-catalyst $SC_b$, are arranged to oxidize additive, and/or to assist the selective catalytic reduction catalyst SCR with a reduction of nitrogen oxides $NO_x$ in the exhaust stream 303, and a selective catalytic reduction catalyst SCR, combined with a purely oxidizing coating in its outlet part; and a slip-catalyst SC, followed downstream by a selective catalytic reduction catalyst SCR, combined with a purely oxidizing coating in its outlet part, wherein the slip-catalyst SC is arranged primarily for reduction of nitrogen oxides $NO_x$, and secondarily for oxidation of additive in the exhaust stream 303.

In this document, a selective catalytic reduction catalyst SCR means a traditional SCR-catalyst (Selective Catalytic Reduction). SCR catalysts usually use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine, upstream of the catalyst as described above. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

In this document, a slip-catalyst SC means a catalyst which is arranged to oxidize additive, and/or to assist a selective catalytic reduction catalyst SCR with a reduction of nitrogen oxides $NO_x$ in the exhaust stream. The use of a first slip-catalyst $SC_1$ in the first device 331 facilitates a greater load, and therefore a better use of the first selective catalytic reduction catalyst $SCR_1$, and it also facilitates a reduction of the starting temperature (the "light off"-temperature) for the $NO_x$-reduction. The slip-catalyst SC may also oxidize nitrogen monoxide NO and/or hydrocarbons HC in the exhaust stream, so that heat/an exothermal reaction is generated.

The fact that the first device 331 comprises a slip-catalyst $SC_1$, and/or the additional first slip-catalyst $SC_{1b}$, which are multifunctional, and accordingly reduce nitrogen oxides $NO_x$ through the use of the additive, and also oxidize the additive, leads to a number of advantages for the exhaust treatment system. The first slip-catalyst $SC_1$, and/or the additional first slip-catalyst $SC_{1b}$, may here be used in symbiosis with the first reduction catalyst $SCR_1$, so that the activity of the first slip-catalyst $SC_1$ and/or the additional first slip-catalyst $SC_{1b}$, with respect to the reduction of nitrogen oxides $NO_x$ and oxidation of residues of additive, and the slip-catalyst's $SC_1$, $SC_{1b}$ deposit characteristics for additive, constitute a complement to the function of the first reduction catalyst $SCR_1$. The combination of these characteristics for the first device 331, comprising the first reduction catalyst $SCR_1$, the first slip-catalyst $SC_1$, and/or the additional first slip-catalyst $SC_{1b}$, mean that a higher conversion level may be obtained over the first device 331. Additionally, the use of the first slip-catalyst $SC_1$, and/or of the additional first slip-catalyst $SC_{1b}$, in the first device 331, result in conditions making it possible to avoid that a non-selective oxidation of reductant occurs in components placed downstream of the first device 331 in the exhaust treatment system, which may potentially comprise platinum metals.

Furthermore, tests have shown that the reduction of nitrogen oxides $NO_x$ with the first multifunctional slip-catalyst $SC_1$, and/or the additional first slip-catalyst $SC_{1b}$ in the first device 331 becomes surprisingly efficient. This is a result of sufficient amounts of nitrogen oxides $NO_x$ being present in the exhaust stream 303 at the first slip-catalyst $SC_1$, and/or at the additional first slip-catalyst $SC_{1b}$ in the first device 331, in order for an efficient reduction of nitrogen oxides $NO_x$ to be obtained. In other words, the relatively good availability of nitrogen oxides $NO_x$ at the first slip-catalyst $SC_1$, and/or at the additional first slip-catalyst $SC_{1b}$, may be used to achieve a very good performance and/or a very good utilization when a multifunctional slip-catalyst $SC_1$, and/or an additional first slip-catalyst $SC_{1b}$, is used in the first catalyst device 331.

The first selective catalytic reduction catalyst $SCR_1$, the first slip-catalyst $SC_1$, and/or the additional first slip-catalyst $SC_{1b}$, may be used with the objective of generating heat, for example by oxidation of hydrocarbons HC in the exhaust stream, which enables regeneration of sulphur contaminated components, such as the first selective catalytic reduction catalyst $SCR_1$, and/or components arranged downstream of the latter. At the regeneration of the sulphur contaminated components, the amount of sulphur intercalated in the components is reduced, that is to say in at least one of the first selective catalytic reduction catalyst $SCR_1$, and components arranged downstream of the latter.

The system according to the present invention may be arranged to perform all of the method embodiments described above and in the claims, so that the system for the respective embodiments obtains the above described advantages for the respective embodiments.

A person skilled in the art will also realize that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but pertains to and comprises all embodiments within the scope of the enclosed independent claims.

The invention claimed is:

1. A method for treatment of an exhaust stream, resulting from a combustion in a combustion engine, passing through an exhaust treatment system, and comprising nitrogen oxides ($NO_x$), wherein said nitrogen oxides ($NO_x$) comprise nitrogen monoxide (NO) and nitrogen dioxide ($NO_2$); said method comprising:

oxidizing compounds comprising one or several of nitrogen, carbon and hydrogen in said exhaust stream, wherein said oxidizing is carried out using at least one oxidizing component arranged in said exhaust treatment system;

reducing an amount of nitrogen oxides ($NO_x$) reaching a reduction catalyst device, which is arranged downstream of said oxidizing component in said exhaust treatment system, wherein said reduction is carried out through a catalytic reaction using an additive, and wherein said reducing uses reduction catalyst devices comprising:

a first reduction catalyst device arranged upstream of a particulate filter of said exhaust treatment system to provide a first impact on a first amount of nitrogen oxides reaching said first reduction catalyst device; and a second reduction catalyst device arranged downstream of said particulate filter to provide a second impact on a second amount of nitrogen oxides reaching said second reduction catalyst device;

determining a value $(NO_2/NO_x)_{det}$ for a ratio between an amount of nitrogen dioxide ($NO_2$) reaching said reduction catalyst device, and said amount of nitrogen oxide (NO$_x$) reaching said reduction catalyst device; and actively controlling at least one parameter related to said combustion engine, based on said determined value (NO$_2$/NO$_x$)$_{det}$ for said ratio, wherein said active control is carried out, so that said amount of nitrogen oxide (NO$_x$) reaching said reduction catalyst device is increased, when said determined value (NO$_2$/NO$_x$)$_{det}$ for said ratio exceeds an upper threshold value (NO$_2$/NO$_x$)$_{threshold\_high}$; (NO$_2$/NO$_x$)$_{det}$>(NO$_2$/NO$_x$)$_{threshold\_high}$.

2. The method according to claim 1, wherein the increase of said amount of nitrogen oxides (NO$_x$) reaching said reduction catalyst device, during actively controlling, entails that said amount of nitrogen oxides (NO$_x$) reaching said reduction catalyst device is greater than an amount of nitrogen oxides (NO$_x$) comprised in said determined value (NO$_2$/NO$_x$)$_{det}$ for said ratio.

3. The method according to claim 1, wherein the increase of said amount of nitrogen oxides (NO$_x$) reaching said reduction catalyst device, during actively controlling, entails that said amount of nitrogen oxides (NO$_x$) reaching said reduction catalyst device has a higher concentration of nitrogen oxides (NO$_x$) in said exhaust stream, than does a concentration of nitrogen oxides (NO$_x$) that corresponds to said determined value (NO$_2$/NO$_x$)$_{det}$ for said ratio.

4. The method according to claim 1, wherein said actively controlling further comprises actively controlling of said at least one parameter related to a combustion in said combustion engine, so that said amount of nitrogen oxides (NO$_x$) reaching said reduction catalyst device is reduced, when said determined value (NO$_2$/NO$_x$)$_{det}$ for said ratio is smaller or equal to a lower threshold value (NO$_2$/NO$_x$)$_{threshold\_low}$, (NO$_2$/NO$_x$)$_{det}$≤(NO$_2$/NO$_x$)$_{threshold\_low}$.

5. The method according to claim 4, wherein the reduction of said amount of nitrogen oxides (NO$_x$) reaching said reduction catalyst device entails that said amount of nitrogen oxides (NO$_x$) reaching said reduction catalyst device is smaller than an amount of nitrogen oxides (NO$_x$) comprised in said determined value (NO$_2$/NO$_x$)$_{det}$ for said ratio.

6. The method according to claim 4, wherein the reduction of said amount of nitrogen oxides (NO$_x$) reaching said reduction catalyst device entails that said amount of nitrogen oxides (NO$_x$) reaching said reduction catalyst device has a lower concentration of nitrogen oxides (NO$_x$) in said exhaust stream, compared to a concentration of nitrogen oxides (NO$_x$) that corresponds to said determined value (NO$_2$/NO$_x$)$_{det}$ for said ratio.

7. The method according to claim 4, wherein said lower threshold value (NO$_2$/NO$_x$)$_{threshold\_low}$ has a value representing one of:
50%;
45%;
30%;
20%; and
10%.

8. The method according to claim 4, wherein said lower threshold value (NO$_2$/NO$_x$)$_{threshold\_low}$ has a value, which depends on a temperature over said reduction catalyst device.

9. The method according to claim 1, wherein said upper threshold value (NO$_2$/NO$_x$)$_{threshold\_high}$ has a value representing one of:
45%;
50%;
60%; and
>65%.

10. The method according to claim 1, wherein said upper threshold value (NO$_2$/NO$_x$)$_{threshold\_low}$ has a value, which depends on a temperature over said reduction catalyst device.

11. The method according to claim 1, wherein said actively controlling of said at least one parameter comprises selecting at least one injection strategy for said combustion engine.

12. The method according to claim 11, wherein said at least one injection strategy comprises controlling of a timing for an injection of fuel into respective cylinders in said combustion engine.

13. The method according to claim 12, wherein an increase of said amount of nitrogen oxides (NO$_x$) reaching said reduction catalyst device is achieved by advancing said timing for said injection.

14. The method according to claim 12, wherein a reduction of said amount of nitrogen oxides (NO$_x$) reaching said reduction catalyst device is achieved by delaying said timing for said injection.

15. The method according to claim 11, wherein said at least one injection strategy comprises controlling an injection pressure for an injection of fuel into respective cylinders in said combustion engine.

16. The method according to claim 15, wherein an increase of said amount of nitrogen oxides (NO$_x$) reaching said reduction catalyst device is achieved by increasing said injection pressure.

17. The method according to claim 15, wherein a reduction of said amount of nitrogen oxides (NO$_x$) reaching said reduction catalyst device is achieved by reducing said injection pressure.

18. The method according to claim 11, wherein said at least one injection strategy comprises controlling an injection phasing for an injection of fuel into respective cylinders in said combustion engine.

19. The method according to claim 18, wherein an increase of said amount of nitrogen oxides (NO$_x$) reaching said reduction catalyst device is achieved by controlling an injection phasing to achieve a relatively large pressure gradient.

20. The method according to claim 18, wherein a reduction of said amount of nitrogen oxides (NO$_x$) reaching said reduction catalyst device is achieved by controlling an injection phasing to achieve a relatively small pressure gradient.

21. The method according to claim 1, wherein said actively controlling comprises control of a device for exhaust recirculation.

22. The method according to claim 21, wherein an increase of said amount of nitrogen oxides (NO$_x$) reaching said reduction catalyst device is achieved by reducing a fraction of said exhaust stream, which is recirculated through said device for exhaust recirculation.

23. The method according to claim 21, wherein a reduction of said amount of nitrogen oxides (NO$_x$) reaching said reduction catalyst device is achieved by increasing a fraction of said exhaust stream, which is recirculated through said device for exhaust recirculation.

24. The method according to claim 1, wherein said determined value (NO$_2$/NO$_x$)$_{det}$ for said ratio between said amount of nitrogen dioxide (NO$_2$) reaching said reduction catalyst device and said amount of nitrogen oxides (NO$_x$) reaching said reduction catalyst device, consists of one of:
a predicted value;
a modelled value; and
a measured value.

25. The method according to claim 1, wherein said oxidizing component comprises one or several of:
- an oxidation catalyst; and
- said particulate filter, at least partly comprising a catalytic oxidizing coating.

26. A computer program product for treatment of an exhaust stream, which results from a combustion in a combustion engine, said computer program product comprising computer program code stored on a non-transitory computer readable medium, said computer program code comprising computer instructions to cause one or more computer processors to perform the operations of:
- oxidizing of compounds comprising one or several of nitrogen, carbon and hydrogen in said exhaust stream, wherein said oxidizing is carried out using at least one oxidizing component arranged in said exhaust treatment system;
- reducing an amount of nitrogen oxides ($NO_x$) reaching a reduction catalyst device, which is arranged downstream of said oxidizing component in said exhaust treatment system, wherein said reduction is carried out through a catalytic reaction using an additive, and wherein said reducing uses reduction catalyst devices comprising:
  - a first reduction catalyst device arranged upstream of a particulate filter of said exhaust treatment system to provide a first impact on a first amount of nitrogen oxides reaching said first reduction catalyst device; and
  - a second reduction catalyst device arranged downstream of said particulate filter to provide a second impact on a second amount of nitrogen oxides reaching said second reduction catalyst device;
- determining a value $(NO_2/NO_x)_{det}$ for a ratio between an amount of nitrogen dioxide ($NO_2$) reaching said reduction catalyst device, and said amount of nitrogen oxide ($NO_x$) reaching said reduction catalyst device; and
- actively controlling at least one parameter related to said combustion engine, based on said determined value $(NO_2/NO_x)_{det}$ for said ratio, wherein said active control is carried out, so that said amount of nitrogen oxide ($NO_x$) reaching said reduction catalyst device is increased, when said determined value $(NO_2/NO_x)_{det}$ for said ratio exceeds an upper threshold value $(NO_2/NO_x)_{threshold\_high}$; $(NO_2/NO_x)_{det} > (NO_2/NO_x)_{threshold\_high}$.

27. An exhaust treatment system arranged for treatment of an exhaust stream, which results from a combustion in a combustion engine, and comprises nitrogen oxides ($NO_x$), wherein said nitrogen oxides ($NO_x$) comprise nitrogen monoxide (NO) and nitrogen dioxide ($NO_2$); said system comprising:
- at least one oxidizing component, arranged in said exhaust treatment system for an oxidation of compounds comprising one or several of nitrogen, carbon and hydrogen in said exhaust stream;
- a reduction catalyst device, arranged downstream of said oxidizing component in said exhaust treatment system, for a reduction of an amount of nitrogen oxides ($NO_x$) reaching said reduction catalyst device, wherein said reduction is carried out through a catalytic reaction using an additive and wherein said reduction catalyst device includes a first reduction catalyst device arranged upstream of a particulate filter of said exhaust treatment system to provide a first impact on a first amount of nitrogen oxides reaching said first device and a second reduction catalyst device arranged downstream of said particulate filter to provide a second impact on a second amount of nitrogen oxides reaching said second device; and
- a control device, arranged to provide:
  - a determination of a value $(NO_2/NO_x)_{det}$ for a ratio between an amount of nitrogen dioxide $NO_2$ reaching said reduction catalyst device and said amount of nitrogen oxides ($NO_x$) reaching said reduction catalyst device; and
  - an active control of at least one parameter related to a combustion engine, based on said determined value $(NO_2/NO_x)_{det}$ for said ratio, wherein said active control is carried out, so that said amount of nitrogen oxides ($NO_x$) reaching said reduction catalyst device increases, when said determined value $(NO_2/NO_x)_{det}$ for said ratio exceeds an upper threshold value $(NO_2/NO_x)_{threshold\_high}$; $(NO_2/NO_x)_{det} > (NO_2/NO_x)_{threshold\_high}$.

28. The exhaust treatment system according to claim 27, wherein said oxidizing component comprises at least one of:
- an oxidation catalyst;
- said particulate filter, at least partly comprising a catalytic oxidizing coating; and
- an oxidation catalyst, followed downstream by a particulate filter.

29. The exhaust treatment system according to claim 27, wherein said reduction catalyst device comprises one of:
- a selective catalytic reduction catalyst (SCR);
- a selective catalytic reduction catalyst (SCR), followed downstream by a slip-catalyst (SC), wherein said slip-catalyst (SC) is arranged to oxidize a residue of additive, and/or assist said selective catalytic reduction catalyst (SCR) with an additional reduction of nitrogen oxide $NO_x$ in said exhaust stream;
- a slip-catalyst (SC), which is arranged primarily for reduction of nitrogen oxides ($NO_x$), and secondarily for oxidation of additive in said exhaust stream; a slip-catalyst (SC), followed downstream by a selective catalytic reduction catalyst (SCR), wherein said slip-catalyst (SC) is arranged to oxidize additive, and/or to assist said selective catalytic reduction catalyst (SCR) with a reduction of nitrogen oxides ($NO_x$) in said exhaust stream;
- a slip-catalyst (SC), followed downstream by a selective catalytic reduction catalyst (SCR), followed downstream by an additional slip-catalyst ($SC_b$), wherein said slip-catalyst (SC), and/or said additional slip-catalyst ($SC_b$), are arranged to oxidize additive, and/or to assist said selective catalytic reduction catalyst (SCR) with a reduction of nitrogen oxides ($NO_x$) in said exhaust stream;
- a selective catalytic reduction catalyst (SCR), combined with a purely oxidizing coating in its outlet part; and
- a slip-catalyst (SC), followed downstream by a selective catalytic reduction catalyst (SCR), combined with a purely oxidizing coating in its outlet part, wherein said slip-catalyst (SC) is arranged primarily for reduction of nitrogen oxide ($NO_x$), and secondarily for oxidation of additive in said exhaust stream.

* * * * *